Nov. 16, 1971            E. H. BOBO            3,619,821

PLUMBING OF A TANK FILLER VALVE FOR A COMMODE

Filed March 9, 1970            3 Sheets-Sheet 1

*INVENTOR.*
EVAN H. BOBO

INVENTOR.
EVAN H. BOBO

Nov. 16, 1971     E. H. BOBO     3,619,821

PLUMBING OF A TANK FILLER VALVE FOR A COMMODE

Filed March 9, 1970     3 Sheets-Sheet 3

*INVENTOR.*
EVAN H. BOBO

United States Patent Office 3,619,821
Patented Nov. 16, 1971

3,619,821
PLUMBING OF A TANK FILLER VALVE
FOR A COMMODE
Evan H. Bobo, 501 N. Pearl St., McArthur, Ohio 45651
Filed Mar. 9, 1970, Ser. No. 877,178
Int. Cl. E03d 1/36
U.S. Cl. 4—41                         2 Claims

ABSTRACT OF THE DISCLOSURE

A control for the filling of a flush tank for a commode depending on the weight of a proportionate part of the water flowing into the flush tank. The control includes a three-way valve allowing water, when the valve is open, to flow into three separate conduits. One conduit leads to the flush tank, one to the commode, and the third to a relatively small auxiliary weight tank. The valve has its control stem connected to and operated by the relatively small auxiliary weight tank (which is sometimes herein designated as a water weight control box) into which a relatively small proportion of the water flowing through the valve flows. The amount of water flowing through the third conduit is controlled by a needle valve.

BACKGROUND OF THE INVENTION

Most of the devices in general use as shut-off valves for flush tanks depend upon a float ball and arm which are moved by the use of water in the flush tank to raise the ball and arm and thus close the valve. With this type of shut-off valve, a leak in the flush tank outflow valve can prevent the level of water in the flush tank from ever attaining a level sufficient to provide inlet valve shut-off force to effect a positive valve shut off. This condition, of course, permits a continuous flow of water into the tank and out of the tank outflow valve. The obvious waste of water is an undesirable condition.

Other devices that are in general use as shutoff valves for this usage are generally more complex and are, therefore, much more susceptible to mechanical failure. Most of these devices in general use depend upon the flush tank filling in order to effect a shutoff. This is not true of this invention.

There is, therefore, a need for a commode flush tank water supply control which does not depend solely upon the amount of water in the flush tank.

SUMMARY OF THE INVENTION

This invention relates to a tank filler valve for a commode designed to prevent the waste of water.

In the art to which the invention relates is the saving of water in the flushing of a commode in areas where water supplies are limited. Since this is obviously an undesirable condition, considerable time and effort has been devoted to designing an apparatus which will prevent this. However, to my knowledge, no apparatus using this mechanism has so far been designed.

The main object of this invention is to provide a positive shutoff of the water flow into the flush tank after a predetermined quantity of water is delivered to fill the flush box. After this quantity of water has been delivered, this invention shuts off the water supply whether the tank has filled or not.

Another object of this invention is its mechanical simplicity. This invention has but one moving part.

Another object of this invention is the elimination of the float ball and arm. Other objects will appear from the following description, the claims appended thereto and from the annexed drawings in which like references designate like parts throughout the several views.

Figure 1:
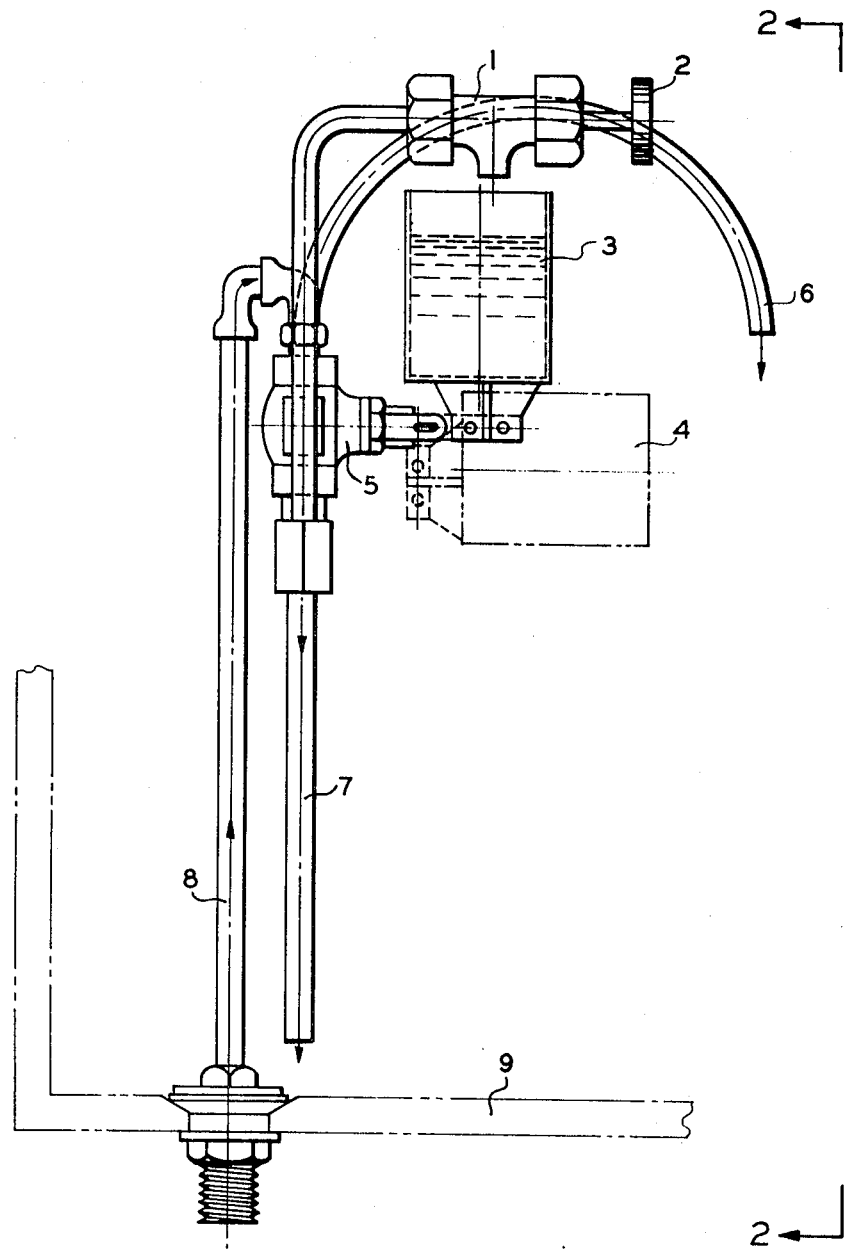
FIG. 1 is a view in side elevation of an apparatus formed in accordance with the present invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

Figure 3:
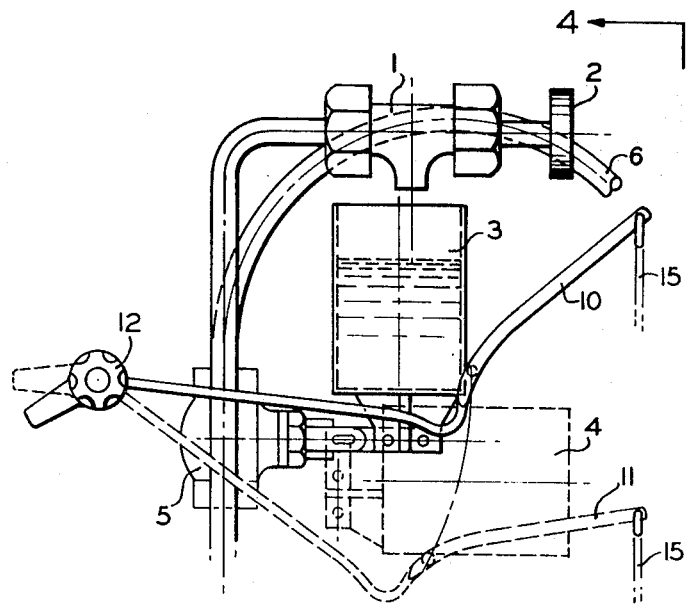
FIG. 3 is also a view in side elevation but shows in addition some parts not shown in FIG. 1 and thus illustrates the actuating mechanism of the flush lever and connecting linkage.
Figure 4:
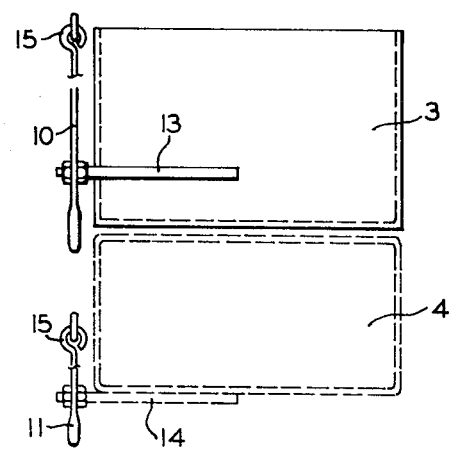
FIG. 4 is also a view in front elevation of the small auxiliary tank or water weight control box, or more concisely the weight tank, the box being shown in the position in which the control valve is open in full lines and in which the control valve is closed in dashed lines, many other elements of the apparatus which are shown in FIGS. 1–3, inclusive being omitted.

In FIGS. 1, 3 and 4, the item designated 4 and drawn in dashed lines is shown in the position it assumes when the shutoff valve 5 is in the open position and when in this position, it is designated as item 3. The item variously designated as 3 and 4 is called the water weight control box.

Figure 2:
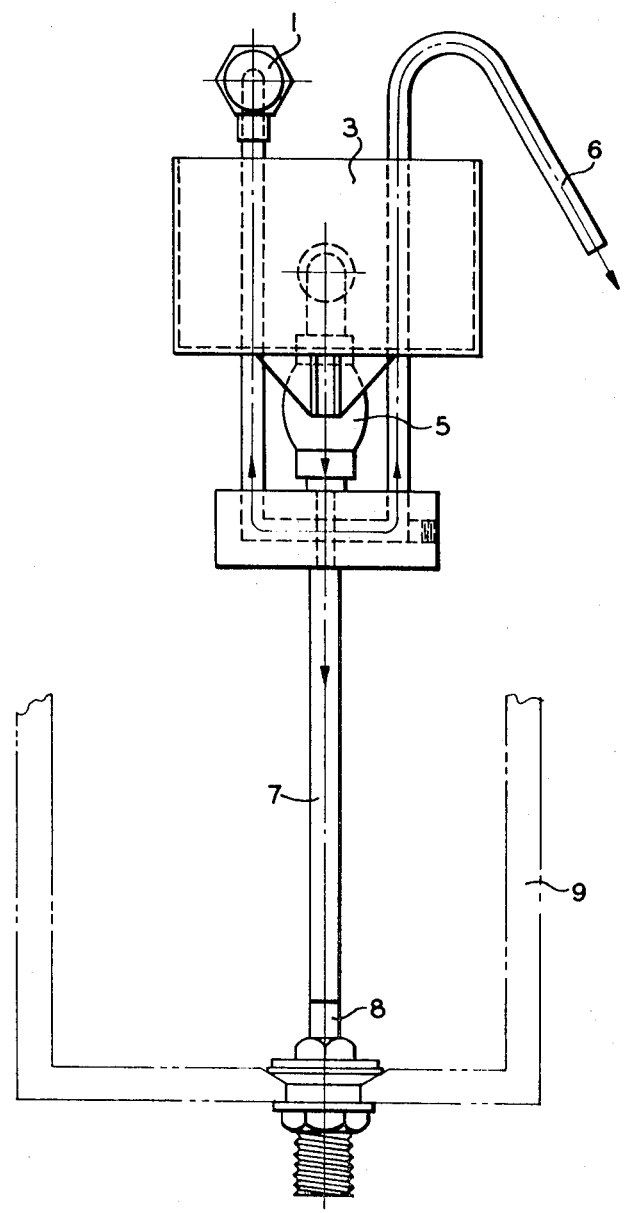
FIG. 2 is a view in front elevation of the apparatus shown in FIG. 1.

This invention is intended to shut off the water flow into the flush tank, a section of which is designated as item 9 in FIGS. 1 and 2, at a predetermined level below the elevation of item 4. In addition, it provides a mechanism for actuating the flush tank outflow valve. The tank outflow valve is now shown but is connected to the link designated 15.

The operation of the device is described as follows: The water supply is connected to the tube 8 and flows through the valve designated 5 and is divided into three streams, one of which flows through tube 7 into the flush tank, one which flows through the throttle valve 1 into the water weight control box 8 and one which flows through the tube 6 into the commode bowl. Initially, the water weight control box is in the position shown when it is designated 3 and the valve 5 is in the open position. Water flows simultaneously then into the water weight control box, the flush tank and the commode bowl. The throttle valve 1 is a needle valve and the position of the needle is varied by turning the valve stem knob designated 2 until the flow rate into water control box is established at the correct flow. The correct flow rate is established at a valve that will provide sufficient weight in the weight control box to trip the valve 5 and shut off the water supply when the water in the flush tank has attained a level just below the item 4. The valve 5 is a toggle valve and a predetermined force is required to toggle it from open position to the closed position. When the valve toggles from the open to the closed position, the weight control box drops into the position it assumes when designated as item 4 in the figures and the water contained in the weight control box is dumped into the flush tank 9. When the valve is toggled to the closed position, the water flow through the valve 5 is positively stopped. This positive flow stoppage is one of the primary advantages of this device. The device in popular use provides an inlet valve shutoff force that is directly proportional to the level of water in the flush tank. With the popularly-used devices, a leak in the flush tank outflow valve can prevent the level of water in the flush tank from ever attaining a level sufficient to provide enough inlet valve shutoff force to affect a positive valve shutoff. This condition, of course, permits a continuous flow of water into the tank and out of the tank outflow valve. This is just the condition that this device is designed to prevent.

When it is desired to flush the commode, the flush lever 12 shown in FIG. 3 is rotated in a counter clockwise direction. This rotation causes the lever arm designated 11 in FIG. 3 to rotate in the same direction. This movement causes link 15, which is connected to the flush tank outflow valve, to open allowing the water contained in the flush tank to flow into the commode bowl.

The lever arm 11 is fitted with a pin designated as 14 and 13 in FIG. 4. This pin designated as 14 extends under the water weight control box as shown and when the toggle valve is in the closed position, lifts the weight control box 4 when the lever arm 11 is rotated in the counter clockwise direction and causes the valve 5 to toggle to the closed position as the weight control box is moved from the position it is in when designated as item 4 to the position it assumes when designated as item 3. When the lever arm 11 is rotated to the position required to return the weight control box 3 to the position corresponding to a closed toggle valve 5, the lever arm is designated as 10 in FIGS. 3 and 4 and the pin is designated as 13 in FIG. 4.

Since the flush tank 9 outflow valve has a much larger flow capacity than the inlet valve 5, the flush tank empties before an appreciable flow of water into the tank through the toggle valve 5 can take place. When the flush lever 12 is released, it rotates as a result of the force of gravity on the lever arm 10 clockwise to the position shown when it is designated as item 11. This then permits the tank outflow valve to resume its closed position and the inflow of water through the open toggle valve 5 accumulates in the flush tank 9. The water then also flows into the weight control box 3 until the weight of the water toggles the valve 5 back to the closed position. At the time the valve toggles, the flush tank has been refiled.

As can be seen from this description, the valve will sut off after the predetermined amount of water has accumulated in the weight control box 3 even if no water has accumulated in the flush tank 9. In popularly-used systems, this shutoff will not occur if, for example, the tank outflow valve does not seat and water will be continuously wasted.

Although I have illustrated and described a particular embodiment of my invention, I do not desire to be limited to the particular arrangement set forth and I intend in the following claims to cover all modifications which do not depart from the spirit and scope of my invention. It is believed apparent that the invention is not necessarily confined to the specific use or uses thereof described above since it may be utilized for any purpose to which it might be suited. Nor is the invention to be necessarily limited to the specific construction illustrated and described, since such construction is only intended to be illustrative of the principle of operation and the means presently devised to carry out said principle. It is to be considered that the invention comprehends any minor change in construction that may be permitted within the scope of the appended claims.

What is claimed is:

1. A device of the character described for the delivery of a predetermined amount of liquid into a flush tank which will operate satisfactorily under varying conditions of pressure and which will provide a positive shutoff of the liuqid supply independent of the level of the liquid in the tank comprising:
   a liquid supply line;
   a flush tank;
   a weight tank;
   a valve to which said liquid supply line is connected as an inlet to said valve, and which has a moving part to open and close said valve;
   outlet lines from said valve comprising a line connected to said flush tank for supplying liquid to said flush tank and a line connected to said weight tank for supplying liquid to said weight tank;
   means in said line connected to said weight tank for constricting the flow therethrough to an amount less than but proportionate to the amount of the flow in said line connected to the flush tank;
   means dependent upon the weight of the liquid in the weight tank for controlling the valve to close the valve whenever the weight of liquid in said weight tank exceeds a predetermined amount; a lever; and means dependent upon the operation of the lever for raising the weight tank and for closing the valve.

2. A device of the character described for the delivery of a predetermined amount of liquid into a flush tank which will operate satisfactorily under varying conditions of pressure and which will provide a positive shutoff of the liquid supply independent of the level of the liquid in the tank comprising:
   a liquid supply line;
   a flush tank having an outflow valve;
   a flush lever;
   a weight tank;
   a valve to which said liquid supply line is connected as an inlet to said valve, and which has a moving part to open and close said valve;
   outlet lines from said valve comprising a line connected to said flush tank for supplying liquid to said flush tank and a line connected to said weight tank for supplying liquid to said weight tank;
   means in said line connected to said weight tank for constricting the flow therethrough to an amount less than but proportionate to the amount of the flow in said line connected to the flush tank;
   means dependent upon the weight of the liquid in the weight tank for causing the lowering of the weight tank and for controlling the valve to close the valve whenever the weight of liquid in said weight tank exceeds a predetermined amount;
   means dependent on operation of the flush lever for raising the weight tank to its initial position and for closing the valve;
   the means for controlling the valve to close the valve including:
      a pivoted support for said weight tank;
      a toggle connected to said pivoted support and to the moving part of the valve so that when the liquid in the weight tank reaches the weight exceeding the predetermined amount, the weight tank pivots on said pivoted support, and the toggle operates the moving part of the valve to close the valve and shut off further supply of liquid both to said flush tank and to said weight tank;
   the means for raising the weight tank to its initial position and for closing the valve including said flush lever, a link between said flush lever and the outflow valve, a pin secured to the flush lever and underlying the weight tank in its lowered position so that rotation of the lever to open the outflow valve at the same time raises the weight tank to its upper position.

References Cited

UNITED STATES PATENTS

| | | | |
|---|---|---|---|
| 435,039 | 8/1890 | Hunt | 4—55 X |
| 1,345,920 | 7/1920 | Glennon | 4—55 |
| 1,364,891 | 1/1921 | Schossow | 4—55 |
| 1,794,640 | 3/1931 | Owens | 4—41 |
| 3,325,828 | 6/1967 | Alexander | 4—67 X |
| 2,641,275 | 6/1953 | Stambaugh | 137—404 |
| 3,083,724 | 4/1963 | Johnson | 137—404 |

SAMUEL B. ROTHBERG, Primary Examiner

U.S. Cl. X.R.

4—55, 67